US010793170B2

(12) United States Patent
Nishimura et al.

(10) Patent No.: US 10,793,170 B2
(45) Date of Patent: Oct. 6, 2020

(54) TEMPERATURE SENSOR UNIT-EQUIPPED AXLE BOX DEVICE AND TEMPERATURE DETECTING DEVICE OF RAILCAR BOGIE

(71) Applicant: KAWASAKI JUKOGYO KABUSHIKI KAISHA, Kobe-shi, Hyogo (JP)

(72) Inventors: Takehiro Nishimura, Kobe (JP); Yoshi Sato, Sanda (JP); Keiichiro Kamura, Kobe (JP); Masayuki Mitsue, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 194 days.

(21) Appl. No.: 15/766,856

(22) PCT Filed: Sep. 1, 2016

(86) PCT No.: PCT/JP2016/003988
§ 371 (c)(1),
(2) Date: Apr. 9, 2018

(87) PCT Pub. No.: WO2017/061068
PCT Pub. Date: Apr. 13, 2017

(65) Prior Publication Data
US 2018/0281828 A1 Oct. 4, 2018

(30) Foreign Application Priority Data

Oct. 8, 2015 (JP) .................................. 2015-200001
May 31, 2016 (JP) .................................. 2016-108662

(51) Int. Cl.
*G01K 13/00* (2006.01)
*G01K 1/08* (2006.01)
(Continued)

(52) U.S. Cl.
CPC ................ *B61K 9/04* (2013.01); *B61F 15/20* (2013.01); *F16C 19/525* (2013.01); *G01K 1/143* (2013.01);
(Continued)

(58) Field of Classification Search
USPC ................................. 374/153, 141, 163, 208
See application file for complete search history.

(56) References Cited

U.S. PATENT DOCUMENTS 5,787,814 A * 8/1998 Lopez Gomez ......... B61H 9/00
105/178
5,833,371 A * 11/1998 Gomez .................... B61K 9/04
384/448

(Continued)

FOREIGN PATENT DOCUMENTS

CN           1269503 A    10/2000
JP       H10-217964 A     8/1998
(Continued)

OTHER PUBLICATIONS

Nov. 15, 2016 International Search Report issued in Patent Application No. PCT/JP2016/003988.

*Primary Examiner* — Mirellys Jagan
(74) *Attorney, Agent, or Firm* — Oliff PLC

(57) ABSTRACT

A temperature sensor unit-equipped axle box device of a railcar bogie includes: an axle box accommodating a bearing supporting an axle; a temperature sensor unit attached to the axle box and configured to detect a temperature of an outer ring of the bearing; and an elastic body configured to bias the temperature sensor unit in such a direction that the temperature sensor unit is pressed against the outer ring. The elastic body is elastically deformable so as to follow displacement of the temperature sensor unit around a rotation axis of the bearing.

17 Claims, 8 Drawing Sheets

(51) Int. Cl.
    *G01K 1/14*     (2006.01)
    *G01K 7/00*     (2006.01)
    *B61K 9/04*     (2006.01)
    *B61F 15/20*     (2006.01)
    *F16C 19/52*     (2006.01)
    *G01K 13/08*     (2006.01)
    *G01K 15/00*     (2006.01)

(52) U.S. Cl.
    CPC ........... *G01K 13/08* (2013.01); *G01K 15/005* (2013.01); *F16C 2326/10* (2013.01)

(56) References Cited

U.S. PATENT DOCUMENTS

| | | |
|---|---|---|
| 6,179,471 B1 | 1/2001 | Moretti et al. |
| 6,220,749 B1 | 4/2001 | Wyker |
| 2010/0239204 A1 | 9/2010 | Kaikogi et al. |
| 2013/0342362 A1* | 12/2013 | Martin ................ B61L 15/0027 340/870.16 |
| 2015/0030052 A1* | 1/2015 | Martinetti ............ G01K 13/08 374/179 |
| 2015/0057956 A1* | 2/2015 | Ooe .................... G01M 13/045 702/56 |
| 2016/0325767 A1* | 11/2016 | LeFebvre ............ B61L 15/0027 |
| 2018/0290670 A1* | 10/2018 | Nishimura .......... B61L 15/0081 |
| 2019/0009804 A1* | 1/2019 | Nishimura ................ B61F 5/24 |
| 2019/0047598 A1* | 2/2019 | Nishimura ............... B61K 9/04 |
| 2019/0071105 A1* | 3/2019 | Nishimura ............... B61F 5/10 |
| 2019/0162604 A1* | 5/2019 | Ono ...................... G01K 1/143 |

FOREIGN PATENT DOCUMENTS

| | | |
|---|---|---|
| JP | 2006-234102 A | 9/2006 |
| JP | 2008-116312 A | 5/2008 |
| JP | 4759972 B2 | 8/2011 |
| KR | 10-2000-0011172 A | 2/2000 |
| KR | 10-0361000 B1 | 11/2002 |
| KR | 10-2013-0060816 A | 6/2013 |

\* cited by examiner

TEMPERATURE SENSOR UNIT-EQUIPPED AXLE BOX DEVICE AND TEMPERATURE DETECTING DEVICE OF RAILCAR BOGIE

TECHNICAL FIELD

The present invention relates to a temperature sensor unit-equipped axle box device and temperature detecting device of a railcar bogie.

BACKGROUND ART

Known is a railcar bogie configured such that: a temperature sensor is provided at an axle box accommodating a bearing supporting an axle; and the temperature sensor detects a temperature of an outer ring of the bearing to detect an abnormal temperature rise of the bearing (see PTL 1, for example).

CITATION LIST

Patent Literature

PTL 1: Japanese Laid-Open Patent Application Publication No. 2006-234102

SUMMARY OF INVENTION

Technical Problem

When accommodating the bearing in the axle box, the outer ring of the bearing is only fitted in the axle box. Therefore, the outer ring may be slightly displaced in a direction approaching the axle box or a direction away from the axle box. On this account, there is a possibility that due to influences by vibrations of the bogie and the like, contact of the temperature sensor with the outer ring of the bearing becomes unstable, and accurate temperature detection is not performed. Further, since the axle is press-fitted into an inner ring of the bearing, relative displacement between the inner ring and the axle in a rotational direction does not occur, but the outer ring may be displaced relative to the axle box around a rotation axis. In this case, there is a possibility that by the displacement of the outer ring around the rotation axis, a tip end of the temperature sensor is dragged on the outer ring, and this leads to damages of the temperature sensor.

An object of the present invention is to be able to accurately detect a temperature of an outer ring of a bearing accommodated in an axle box of a railcar bogie and prevent a temperature sensor from being damaged.

Solution to Problem

A temperature sensor unit-equipped axle box device of a railcar bogie according to one aspect of the present invention includes: an axle box accommodating a bearing supporting an axle; a temperature sensor unit attached to the axle box and configured to detect a temperature of an outer ring of the bearing; and an elastic body configured to bias the temperature sensor unit in such a direction that the temperature sensor unit is pressed against the outer ring, the elastic body being elastically deformable so as to follow displacement of the temperature sensor unit around a rotation axis of the bearing.

A temperature detecting device of a railcar bogie according to another aspect of the present invention includes: a temperature sensor unit configured to detect a temperature of an outer ring of a bearing through an opening of an axle box accommodating the bearing, the bearing supporting an axle; and an elastic body configured to bias the temperature sensor unit in such a direction that the temperature sensor unit is pressed against the outer ring, the elastic body being elastically deformable so as to follow displacement of the temperature sensor unit around a rotation axis of the bearing.

According to the above configurations, the temperature sensor unit is biased by the elastic body in such a direction as to be pressed against the outer ring of the bearing. Therefore, even when vibrations of the bogie and or like occur, the temperature sensor unit can stably and accurately detect the temperature of the outer ring. In addition, the elastic body is elastically deformable so as to follow the displacement of the temperature sensor unit around the rotation axis of the bearing. Therefore, force which acts around the rotation axis and may be applied to the temperature sensor unit from the outer ring since the temperature sensor unit is biased toward the outer ring can be elastically absorbed by the displacement of the temperature sensor unit itself. On this account, stress applied to the temperature sensor can be suppressed, and the temperature sensor can be prevented from being damaged.

Advantageous Effects of Invention

According to the present invention, the temperature of the outer ring of the bearing accommodated in the axle box of the railcar bogie can be accurately detected, and the temperature sensor can be prevented from being damaged.

DESCRIPTION OF EMBODIMENTS

Hereinafter, embodiments will be explained in reference to the drawings. In the following explanations, a direction in which a railcar travels and in which a carbody extends is defined as a car longitudinal direction, and a crosswise direction perpendicular to the car longitudinal direction is defined as a car width direction. The car longitudinal direction is also referred to as a forward/rearward direction, and the car width direction is also referred to as a leftward/rightward direction.

Embodiment 1

Figure 1:
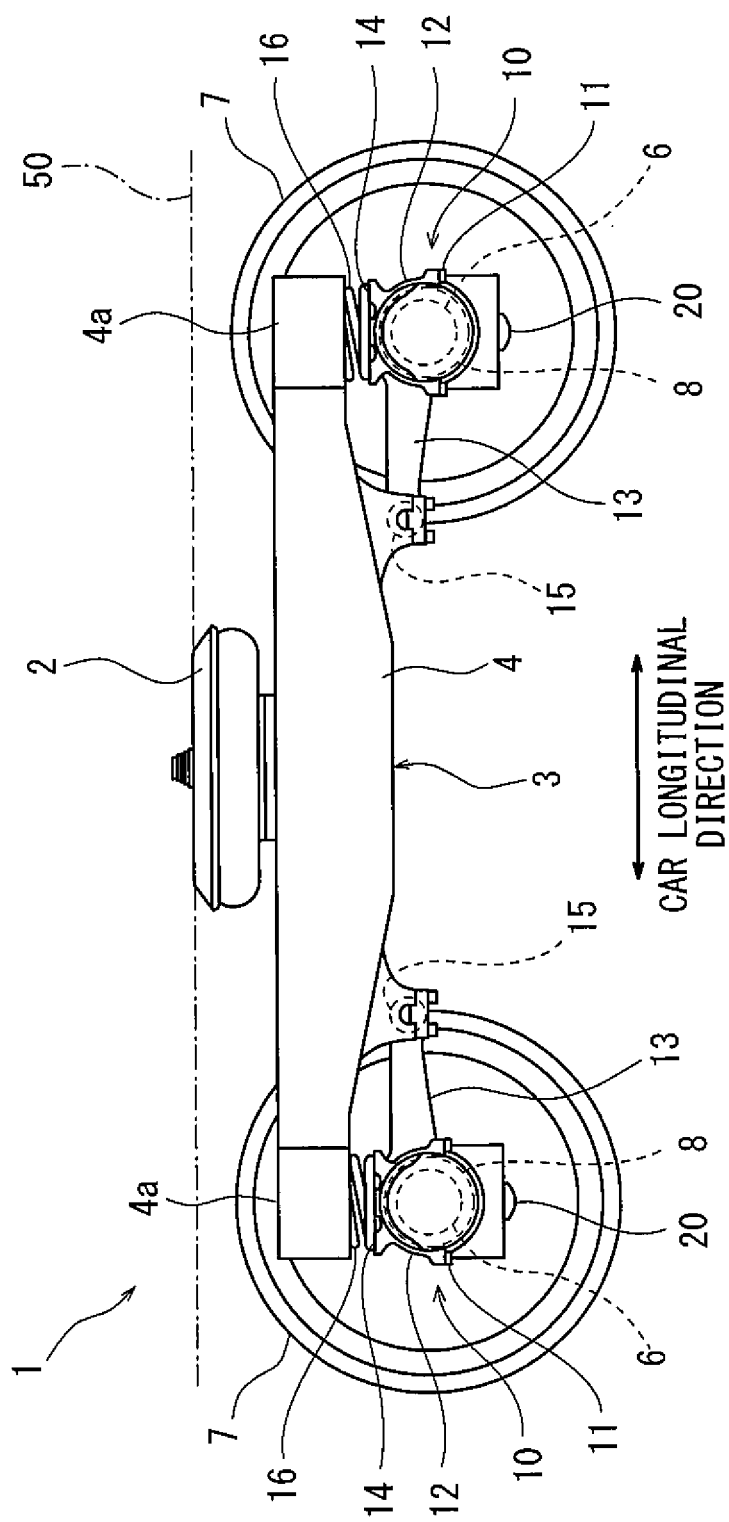
FIG. 1 is a side view of a railcar bogie according to Embodiment 1.

FIG. 1 is a side view of a railcar bogie 1 according to the embodiment. As shown in FIG. 1, the railcar bogie 1 includes a bogie frame 3 supporting a carbody 50 through air springs 2. The bogie frame 3 includes a pair of side sills 4 and a cross beam (not shown) and is formed in an H shape in plan view. The side sills 4 are located at both respective car width direction sides of the bogie frame 3 and extend in the car longitudinal direction. The cross beam couples the side sills 4 to each other and extends in the car width direction. Axles 6 extending in the car width direction are arranged at both respective car longitudinal direction sides of the bogie frame 3. Wheels 7 are fixed to both respective car width direction side portions of each of the axles 6. Bearings 8 rotatably supporting the axle 6 are provided at both respective car width direction end portions of the axle 6 so as to be located outside the respective wheels 7 in the car width direction. Each of the bearings 8 includes an inner ring (not shown), an outer ring 8a (see FIG. 2), and a rolling element (not shown) sandwiched between the inner ring and the outer ring 8a. The bearings 8 are accommodated in respective axle boxes 11 of axle box devices 10.

Each of the axle boxes 11 includes an axle box main body portion 12, an axle beam portion 13 (coupling portion), and a spring receiving portion 14. The axle box main body portion 12 accommodates the bearing 8. The axle beam portion 13 is coupled to the bogie frame 3. The axle beam portion 13 extends integrally from the axle box main body portion 12 toward a car longitudinal direction middle of the bogie 1 in the car longitudinal direction, and a tip end portion of the axle beam portion 13 is elastically coupled to the side sill 4 through a rubber bushing 15. The spring receiving portion 14 is provided at an upper portion of the axle box main body portion 12. A coil spring 16 configured to expand and contract in a vertical direction is interposed between a car longitudinal direction end portion 4a of the side sill 4 and the spring receiving portion 14 of the axle box 11. A temperature sensor unit 20 is attached to a lower portion of the axle box 11.

Figure 2:
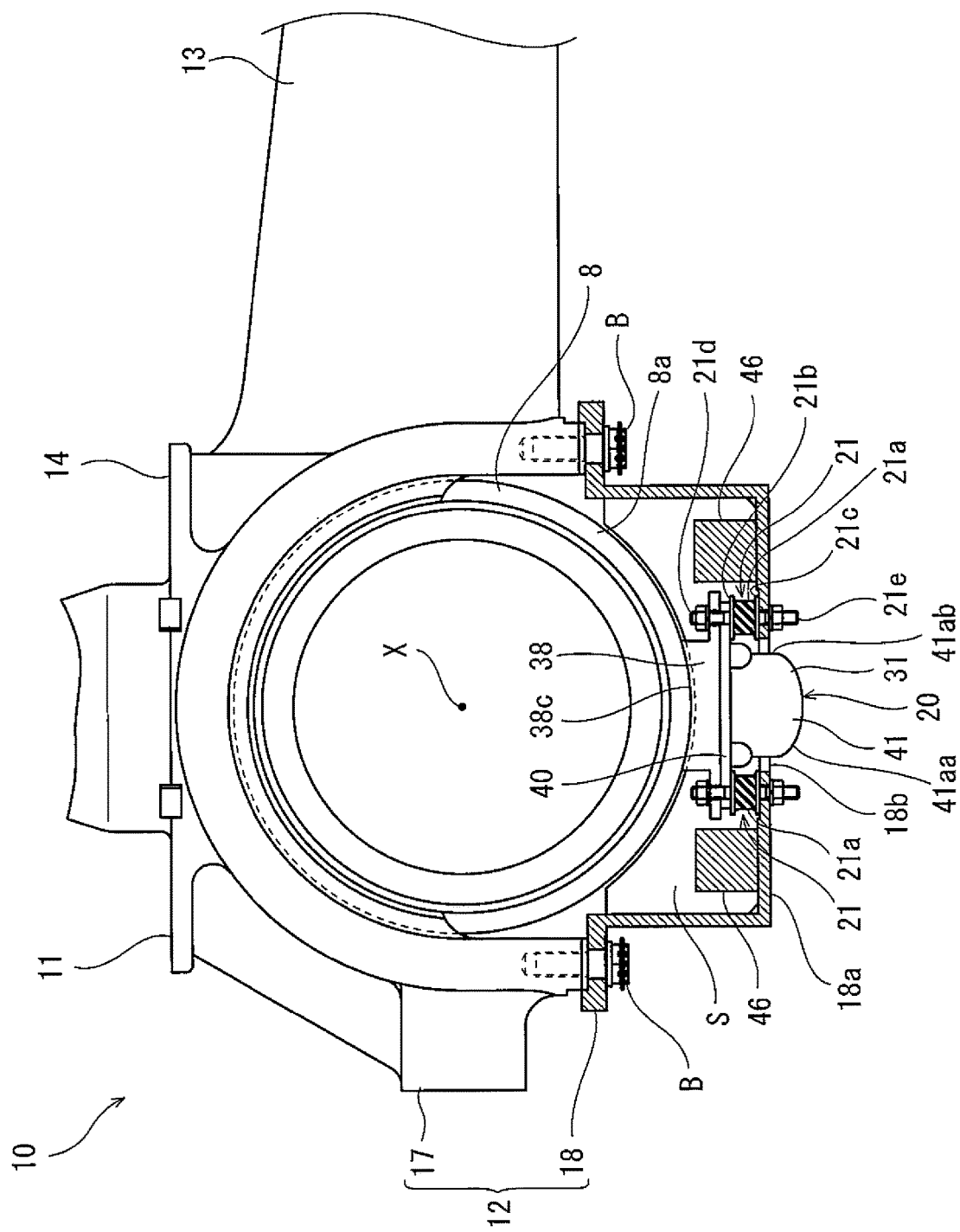
FIG. 2 is a partial sectional side view showing a temperature sensor unit-equipped axle box device of the bogie shown in FIG. 1.
Figure 3:
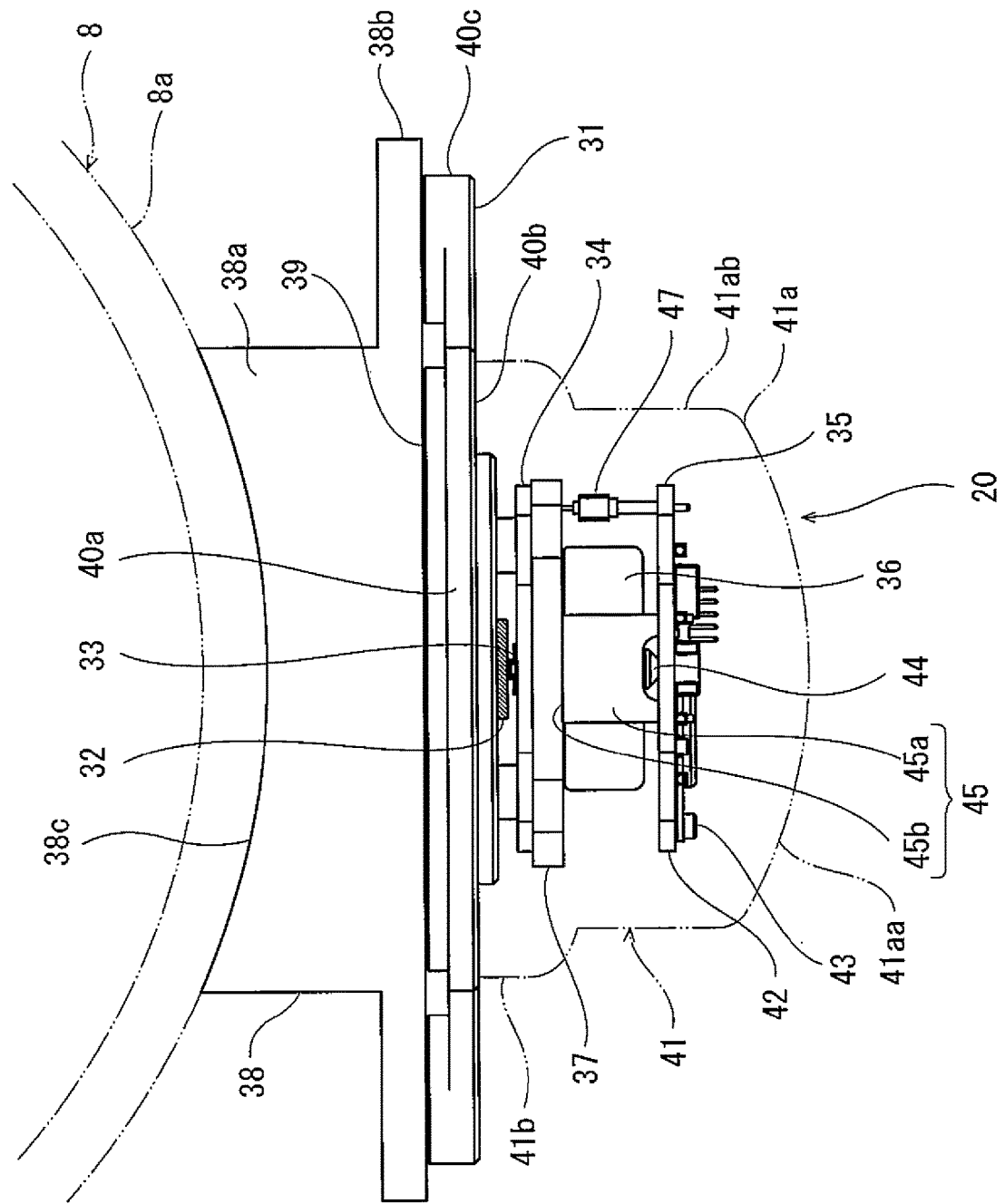
FIG. 3 is a side view of a temperature sensor unit shown in FIG. 2.

FIG. 2 is a partial sectional side view of the axle box device 10 of the bogie 1 shown in FIG. 1, the axle box device 10 including the temperature sensor unit 20. FIG. 3 is a side view of the temperature sensor unit 20 shown in FIG. 2. As shown in FIGS. 2 and 3, the axle box device 10 includes the axle box 11, the temperature sensor unit 20, and a pair of elastic devices 21. The temperature sensor unit 20 and the elastic devices 21 constitute a temperature detecting device. The temperature sensor unit 20 has a wireless communication function. The axle box 11 includes an upper axle box element 17 (first axle box element) and a lower axle box element 18 (second axle box element). The upper axle box element 17 covers an upper region (first region) of an outer peripheral surface of the outer ring 8a of the bearing 8, and the lower axle box element 18 covers a lower region (second region) of the outer peripheral surface of the outer ring 8a of the bearing 8. To be specific, the axle box 11 is divided into two parts that are the upper axle box element 17 supporting a load applied from the bogie frame 3 and the lower axle box element 18 located at a lower side of the upper axle box element 17 and attachable to and detachable from the upper axle box element 17.

The axle beam portion 13, the spring receiving portion 14, and a part of the axle box main body portion 12 are provided at the upper axle box element 17, and another part of the axle box main body portion 12 is provided at the lower axle box element 18. A surface of the upper axle box element 17 which surface covers the outer peripheral surface of the outer ring 8a of the bearing 8 is larger than a surface of the lower axle box element 18 which surface covers the outer peripheral surface of the outer ring 8a of the bearing 8. A lower end of the upper axle box element 17 is located lower than a rotation axis X of the bearing 8. The lower axle box element 18 is smaller in size in the vertical direction than the upper axle box element 17. The lower axle box element 18 is detachably attached to the upper axle box element 17 by bolts B from below.

The temperature sensor unit 20 is attached to the lower axle box element 18 to detect the temperature of the outer ring 8a of the bearing 8. A unit accommodating space S accommodating the temperature sensor unit 20 is formed between the outer peripheral surface (lower surface) of the outer ring 8a of the bearing 8 and the lower axle box element 18. In a state where the temperature sensor unit 20 is accommodated in the unit accommodating space S, the temperature sensor unit 20 projects downward beyond the lower axle box element 18 through an opening 18b formed at a bottom wall portion 18a of the lower axle box element 18. To be specific, a lower end portion of the temperature sensor unit 20 is located lower than the lower axle box element 18 and exposed to an outside of the axle box 11.

The temperature sensor unit 20 includes a housing 31, a thermal conduction sheet 32, a temperature sensor 33, a sensor substrate 34, a wireless communication board 35, a battery 36, and a heat insulating member 37. The temperature sensor unit 20 has a temperature detection function, a wireless communication function, and a power supply function. The housing 31 is a casing accommodating the thermal conduction sheet 32, the temperature sensor 33, the sensor substrate 34, the wireless communication board 35, the battery 36, and the heat insulating member 37.

The housing 31 includes a contact member 38, a thermal conduction sheet 39, a base plate 40, and a cover 41. The contact member 38 and the base plate 40 are made of metal having thermal conductivity, and for example, are made of an aluminum alloy. The thermal conduction sheet 39 is made of a material having elasticity and thermal conductivity, and for example, is made of thermally-conductive silicone rubber.

The cover 41 is made of resin having electrical non-conductivity, and for example, is made of glass fiber-reinforced resin. Specifically, the cover 41 includes an accommodating portion 41a and a flange portion 41b. The accommodating portion 41a has a concave cross section, and the flange portion 41b projects from the accommodating portion 41a toward a lateral side. The accommodating portion 41a includes a bottom plate portion 41aa and a tubular side plate portion 41ab. The bottom plate portion 41aa has a dome shape expanding in a direction away from the base plate 40, and the tubular side plate portion 41ab extends from an outer peripheral edge of the bottom plate portion 41aa toward the flange portion 41b and is cylindrical. In a state where the wireless communication function-equipped temperature sensor unit 20 is attached to the axle box 11, at least the bottom plate portion 41aa of the accommodating portion 41a of the cover 41 is exposed to an outside of the axle box 11 through the opening 18b. In the present embodiment, the bottom plate portion 41aa and a part of the side plate portion 41ab are exposed to the outside of the axle box 11 through the opening 18b.

The contact member 38 includes a heat receiving portion 38a and an axle box attachment portion 38b. The heat receiving portion 38a includes a circular-arc heat receiving surface 38c (upper surface) that is in surface contact with the outer peripheral surface of the outer ring 8a of the bearing 8. The axle box attachment portion 38b projects from the heat receiving portion 38a toward a lateral side. The thermal conduction sheet 39 is sandwiched in a compressed state between the contact member 38 and the base plate 40.

The base plate 40 includes a main body portion 40a, a cover attachment portion 40b provided around the main body portion 40a, and an axle box attachment portion 40c projecting from the cover attachment portion 40b toward a lateral side. The main body portion 40a holds the thermal conduction sheet 32, the temperature sensor 33, the sensor substrate 34, the wireless communication board 35, the battery 36, and the heat insulating member 37. The axle box attachment portion 38b of the contact member 38 and the axle box attachment portion 40c of the base plate 40 are attached to the lower axle box element 18 through the elastic devices 21. The cover 41 has a concave cross section and is attached to the cover attachment portion 40b of the base plate 40 by screws (not shown). The cover 41 covers the thermal conduction sheet 32, the temperature sensor 33, the sensor substrate 34, the wireless communication board 35, the battery 36, and the heat insulating member 37 from below.

The thermal conduction sheet 32 has an electric insulation property and is sandwiched in a compressed state between the base plate 40 and the temperature sensor 33. To be specific, a detecting portion of the temperature sensor 33 is pressed against the thermal conduction sheet 32. The thermal conduction sheet 32 is made of a material having the electric insulation property, the elasticity, and the thermal conductivity, and for example, is made of thermally-conductive silicone rubber. Heat of the outer ring 8a of the bearing 8 is transferred to the contact member 38, the thermal conduction sheet 39, the base plate 40, the thermal conduction sheet 32, and the temperature sensor 33 in this order.

The temperature sensor 33 is mounted on an upper surface of the sensor substrate 34. The sensor substrate 34 includes a sensor circuit configured to output information regarding the temperature of the outer ring 8a to a below-described conversion substrate 42 as an analog temperature signal, the temperature being detected by the temperature sensor 33. The wireless communication board 35 includes the conversion substrate 42 and a wireless communication module 43 (wireless transmission portion). The conversion substrate 42 includes a conversion circuit configured to convert the analog temperature signal, output from the temperature sensor 33, into a digital temperature signal. The conversion substrate 42 and the sensor substrate 34 are connected to each other through a connector 47 extending in the vertical direction. The wireless communication module 43 is mounted on the conversion substrate 42 and wirelessly transmits the digital temperature signal, output from the conversion substrate 42, to an outside of the temperature sensor unit 20 (for example, to a wireless receiver of the railcar) as a wireless signal.

The battery 36 stores electric power supplied to the temperature sensor 33, the sensor substrate 34, and the wireless communication board 35. A first electrode 44 and a second electrode 45 are provided on an upper surface of the wireless communication board 35. The first electrode 44 is one of positive and negative electrodes, and the second electrode 45 is the other of the positive and negative electrodes. The first electrode 44 contacts an electrode of one of surfaces of the battery 36, and the second electrode 45 contacts an electrode of the other surface of the battery 36. The second electrode 45 includes a vertical plate portion 45a and a horizontal plate portion 45b. The vertical plate portion 45a projects from the wireless communication board 35, and the horizontal plate portion 45b projects from the vertical plate portion 45a along the other surface of the battery 36. The battery 36 is sandwiched between the horizontal plate portion 45b of the second electrode 45 and the first electrode 44.

Electric power from the battery 36 is supplied to the wireless communication board 35 through the first electrode 44 and the second electrode 45 and then supplied from the wireless communication board 35 to the sensor substrate 34 and the temperature sensor 33. The heat insulating member 37 is interposed between the sensor substrate 34 and the battery 36 and is larger in area than the battery 36. The contact member 38, the thermal conduction sheet 39, the base plate 40, the thermal conduction sheet 32, the temperature sensor 33, the sensor substrate 34, the heat insulating member 37, the battery 36, and the wireless communication board 35 are arranged in this order from an upper side to a lower side in the temperature sensor unit 20.

The temperature sensor unit 20 is attached to the lower axle box element 18 through the elastic devices 21. The elastic devices 21 are accommodated in the unit accommodating space S and are located at both respective sides of the cover 41. One of the elastic devices 21 is arranged at one circumferential direction side of the outer ring 8a based on the heat receiving surface 38c, and the other of the elastic devices 21 is arranged at the other circumferential direction side of the outer ring 8a based on the heat receiving surface 38c. Each of the elastic devices 21 includes: an elastic body 21a; an upper fixture 21b provided at an upper surface of the elastic body 21a and made of metal; and a lower fixture 21c provided at a lower surface of the elastic body 21a and made of metal. The upper fixture 21b and the lower fixture 21c are displaceable relative to each other in the vertical direction and a horizontal direction by elastic deformation of the elastic body 21a.

The upper fixture 21b is fixed to the axle box attachment portion 38b of the contact member 38 and the axle box attachment portion 40c of the base plate 40. Specifically, the upper fixture 21b includes an upper stud bolt 21d projecting upward, and the axle box attachment portion 38b of the contact member 38 and the axle box attachment portion 40c of the base plate 40 are fixed to the upper stud bolt 21d by a nut. The lower fixture 21c is fixed to the bottom wall portion 18a of the lower axle box element 18. Specifically, the lower fixture 21c includes a lower stud bolt 21e projecting downward, and the lower axle box element 18 is fixed to the lower stud bolt 21e by a nut. The elastic devices 21 bias the temperature sensor unit 20 such that: the elastic bodies 21a are provided in a compressed state in the vertical direction; and the temperature sensor unit 20 is pressed against the outer ring 8a toward the rotation axis X (center) of the bearing 8.

The temperature sensor unit 20 is displaceable relative to the axle box 11 in a predetermined range around the rotation axis X of the bearing 8 by the elastic deformation of the elastic bodies 21a. To be specific, when the temperature sensor unit 20 is displaced along the outer ring 8a, the elastic bodies 21a elastically deform so as to follow the displacement of the temperature sensor unit 20. The axle box 11 includes stopper portions 46 configured to restrict the displacement of the temperature sensor unit 20 around the rotation axis X to the predetermined range. The stopper portions 46 are provided integrally on the lower axle box element 18. When viewed from a direction along the rotation axis X, the stopper portions 46 are arranged at both respective sides of the temperature sensor unit 20 so as to be spaced apart from the temperature sensor unit 20. When the temperature sensor unit 20 is dragged on the outer ring 8a and displaced around the rotation axis X, the housing 31 (specifically, the contact member 38 or the base plate 40) of the temperature sensor unit 20 interferes with the stopper portion 46, and this restricts the displacement of the temperature sensor unit 20 to the predetermined range.

According to the configuration explained above, the temperature sensor unit 20 is biased by the elastic body 21a in such a direction as to be pressed against the outer ring 8a of the bearing 8. Therefore, even when vibrations of the bogie 1 or the like occur, the temperature sensor unit 20 can stably and accurately detect the temperature of the outer ring 8a. In addition, the elastic bodies 21a interposed between the axle box 11 and the temperature sensor unit 20 are elastically deformable so as to follow the displacement of the temperature sensor unit 20 around the rotation axis X. Therefore, force which acts around the rotation axis X and may be applied to the temperature sensor unit 20 from the outer ring 8a since the temperature sensor unit 20 is biased toward the outer ring 8a can be elastically absorbed by the displacement of the temperature sensor unit 20 itself. On this account, stress applied to the temperature sensor 33 can be suppressed, and the temperature sensor 33 can be prevented from being damaged.

While keeping the existing upper axle box element 17 including the axle beam portion 13 and the spring receiving portion 14, the lower axle box element 18 is only required to be modified to have a structure to which the temperature sensor unit 20 can be attached. Therefore, the axle box device 10 with the temperature sensor 33 can be realized easily at low cost. Further, the circular-arc heat receiving surface 38c of the temperature sensor unit 20 is in surface contact with the outer peripheral surface of the outer ring 8a. Therefore, heat transfer from the outer ring 8a to the temperature sensor unit 20 is stabilized, and this improves detection accuracy. In addition, the displacement of the temperature sensor unit 20 caused since the temperature sensor unit 20 is dragged on the outer ring 8a by the displacement of the outer ring 8a around the rotation axis X can be suppressed.

Even when the temperature sensor unit 20 is dragged by the displacement of the outer ring 8a around the rotation axis X, the temperature sensor unit 20 interferes with the stopper portion 46, so that the outer ring 8a can be caused to slide relative to the temperature sensor unit 20. Thus, the temperature sensor 33 can be prevented from being damaged. Further, even when the temperature sensor unit 20 is displaced by being dragged on the outer ring 8a, the temperature sensor unit 20 inclines around the rotation axis X along the outer ring 8a of the bearing 8, so that a state where the heat receiving surface 38c is in surface contact with the outer ring 8a can be maintained.

For example, in FIG. 2, when the temperature sensor unit 20 is displaced clockwise around the rotation axis X, the elastic body 21a of the left elastic device 21 performs shear deformation in the horizontal direction and extension deformation in the vertical direction, and the elastic body 21a of the right elastic device 21 performs shear deformation in the horizontal direction and compression deformation in the vertical direction. As above, since the elastic devices 21 perform different deformations, the temperature sensor unit 20 can incline, and the state where the heat receiving surface 38c is in surface contact with the outer ring 8a can be maintained. Further, the temperature sensor unit 20 transmits the information regarding the detected temperature as the wireless signal. Therefore, it is unnecessary to provide a communication wire between the axle box 11 and the temperature sensor unit 20. Even when the temperature sensor unit 20 is displaced relative to the axle box 11 around the rotation axis X, breaking of the communication wire does not occur.

Embodiment 2

Figure 4:
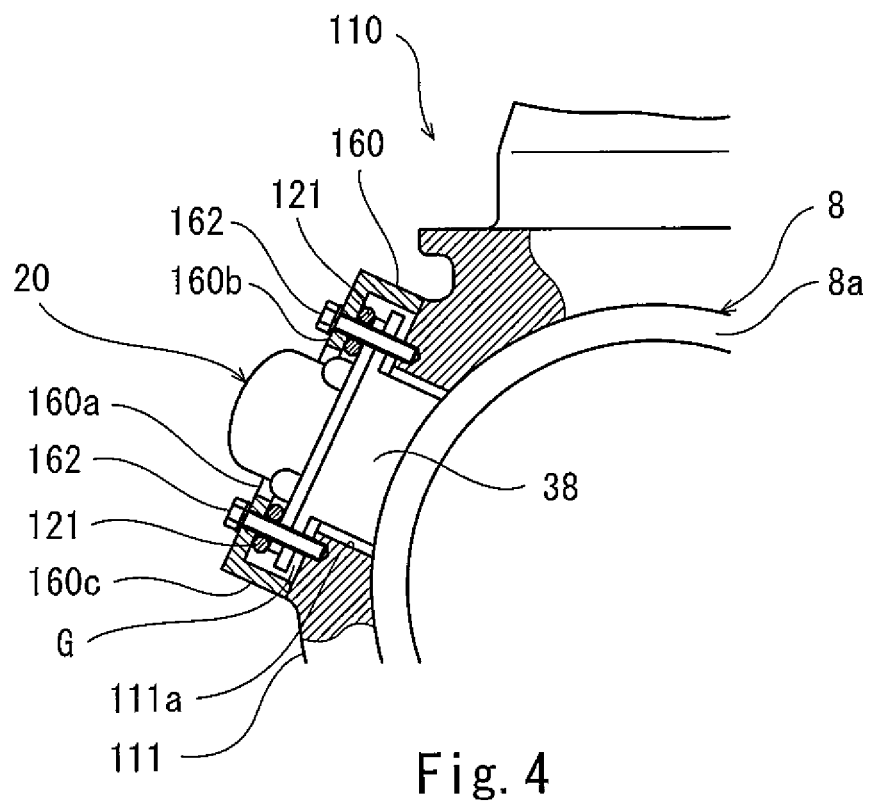
FIG. 4 is a partial sectional side view of major components of the bogie according to Embodiment 2.

FIG. 4 is a partial sectional side view of major components of the bogie according to Embodiment 2. The same reference signs are used for the same components as in Embodiment 1, and explanations of such components are omitted. As shown in FIG. 4, in the bogie of Embodiment 2, an axle box device 110 includes an axle box 111, the temperature sensor unit 20, a pair of elastic bodies 121, a fixing bracket 160, and fastening members 162. The temperature sensor unit 20, the elastic bodies 121, the fixing bracket 160, and the fastening members 162 constitute the temperature detecting device. The axle box 111 is a tubular body formed integrally. An opening 111a is formed at an upper-side portion of the axle box 111 and is open toward an obliquely upper side.

The contact member 38 of the temperature sensor unit 20 extends from an outside of the axle box 111 through the opening 111a, contacts the outer ring 8a of the bearing 8, and detects the temperature of the outer ring 8a. The fixing bracket 160 is arranged outside the temperature sensor unit 20. The elastic bodies 121 are interposed between the temperature sensor unit 20 and the fixing bracket 160 in a radial direction of the bearing 8. It should be noted that a heat insulating member may be interposed between the temperature sensor unit 20 and each elastic body 121. With this, heat from the temperature sensor unit 20 can be prevented from being transferred to the elastic bodies 121, and heat deterioration of the elastic bodies 121 can be prevented.

The fixing bracket 160 includes a substrate portion 160b and a side plate portion 160c. The substrate portion 160b includes a through hole 160a through which the temperature sensor unit 20 is inserted. The side plate portion 160c projects from both ends of the substrate portion 160b toward the axle box 111 and covers the temperature sensor unit 20. In a state where the fixing bracket 160 covers the temperature sensor unit 20 and the elastic bodies 121 from an outside, the fixing bracket 160 is detachably fixed to the axle box 111 from an outside by the fastening members 162 (for example, bolts). Each of the fastening members 162 penetrates the substrate portion 160b of the fixing bracket 160 and the elastic body 121. The side plate portion 160c contacts the axle box 111 in a fastening direction of the fastening member 162 to secure a distance between the fixing bracket 160 and the temperature sensor unit 20.

In a state where a gap G is formed between the temperature sensor unit 20 and the axle box 111 in a direction in which the elastic bodies 121 generate elastic force, the temperature sensor unit 20 extends from an outside of the axle box 111 through the opening 111a and contacts the outer ring 8a of the bearing 8. With this, even if the bearing 8 and the axle box 111 are slightly displaced relative to each other in the radial direction by vibrations or the like, the temperature sensor unit 20 moves by the elastic force of the elastic bodies 121 in such a direction that the gap G narrows, and this maintains the contact of the temperature sensor unit 20 with the bearing 8. Further, by the elastic deformation of the elastic bodies 121, the temperature sensor unit 20 is displaceable relative to the axle box 111 in a predetermined range around the rotation axis of the bearing 8. According to this configuration, the temperature sensor unit 20, the elastic bodies 121, and the fixing bracket 160 can be collectively attached to and detached from the axle box 111. Therefore, maintenance of the temperature sensor unit 20 and the like can be performed without disassembling the axle box 111, and this improves work efficiency. It should be noted that since the other components are the same as those of Embodiment 1, explanations thereof are omitted.

Embodiment 3

Figure 5:
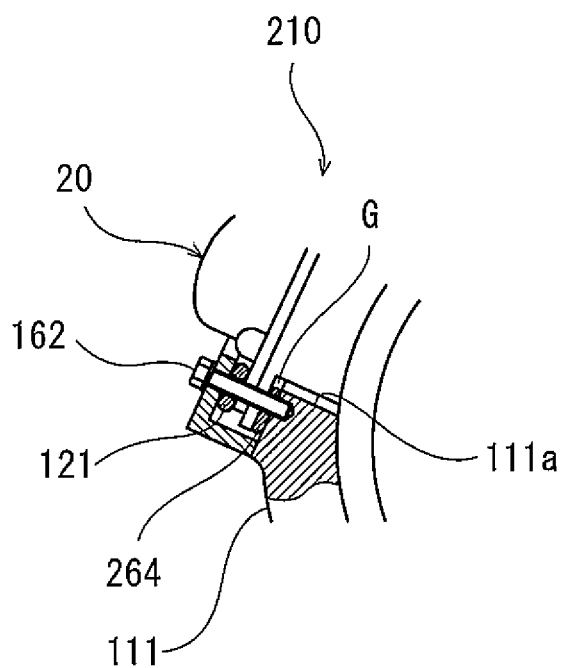
FIG. 5 is a partial sectional side view of major components of the bogie according to Embodiment 3.

FIG. 5 is a partial sectional side view of major components of the bogie according to Embodiment 3. As shown in FIG. 5, in an axle box device 210 of Embodiment 3, a second elastic body 264 is sandwiched at the gap G between the temperature sensor unit 20 and the axle box 111, and the other components are the same as those of Embodiment 2. According to this configuration, even when traveling vibrations are large, vibrations of the temperature sensor unit 20 can be suppressed, and reliability of the temperature sensor unit 20 can be improved. It should be noted that in the following embodiments, an elastic body may or may not be interposed at the gap between the temperature sensor unit and the axle box.

Embodiment 4

Figure 6:
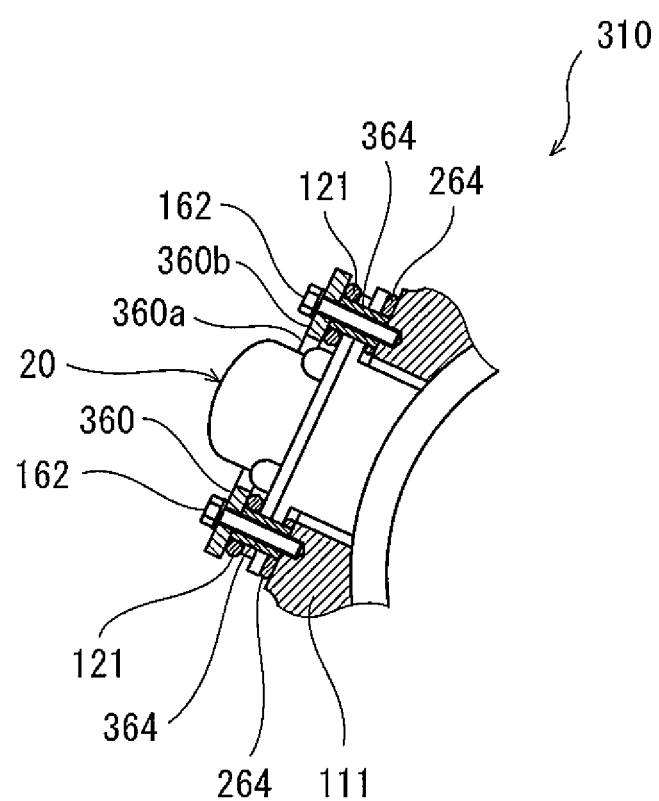
FIG. 6 is a partial sectional side view of major components of the bogie according to Embodiment 4.

FIG. 6 is a partial sectional side view of major components of the bogie according to Embodiment 4. As shown in FIG. 6, in an axle box device 310 of Embodiment 4, a fixing bracket 360 includes only a substrate portion 360*b* having a through hole 360*a* through which the temperature sensor unit 20 is inserted, and does not include the side plate portion 160*c* of Embodiment 2. Instead, a sleeve 364 into which the fastening member 162 is inserted is inserted as a spacer into the elastic body 121. According to this configuration, since the sleeve 364 is sandwiched between the fixing bracket 360 and the axle box 111, a distance between the fixing bracket 360 and the temperature sensor unit 20 in the fastening direction of the fastening member 162 is secured. The other components are the same as those of Embodiment 3.

Embodiment 5

Figure 7:
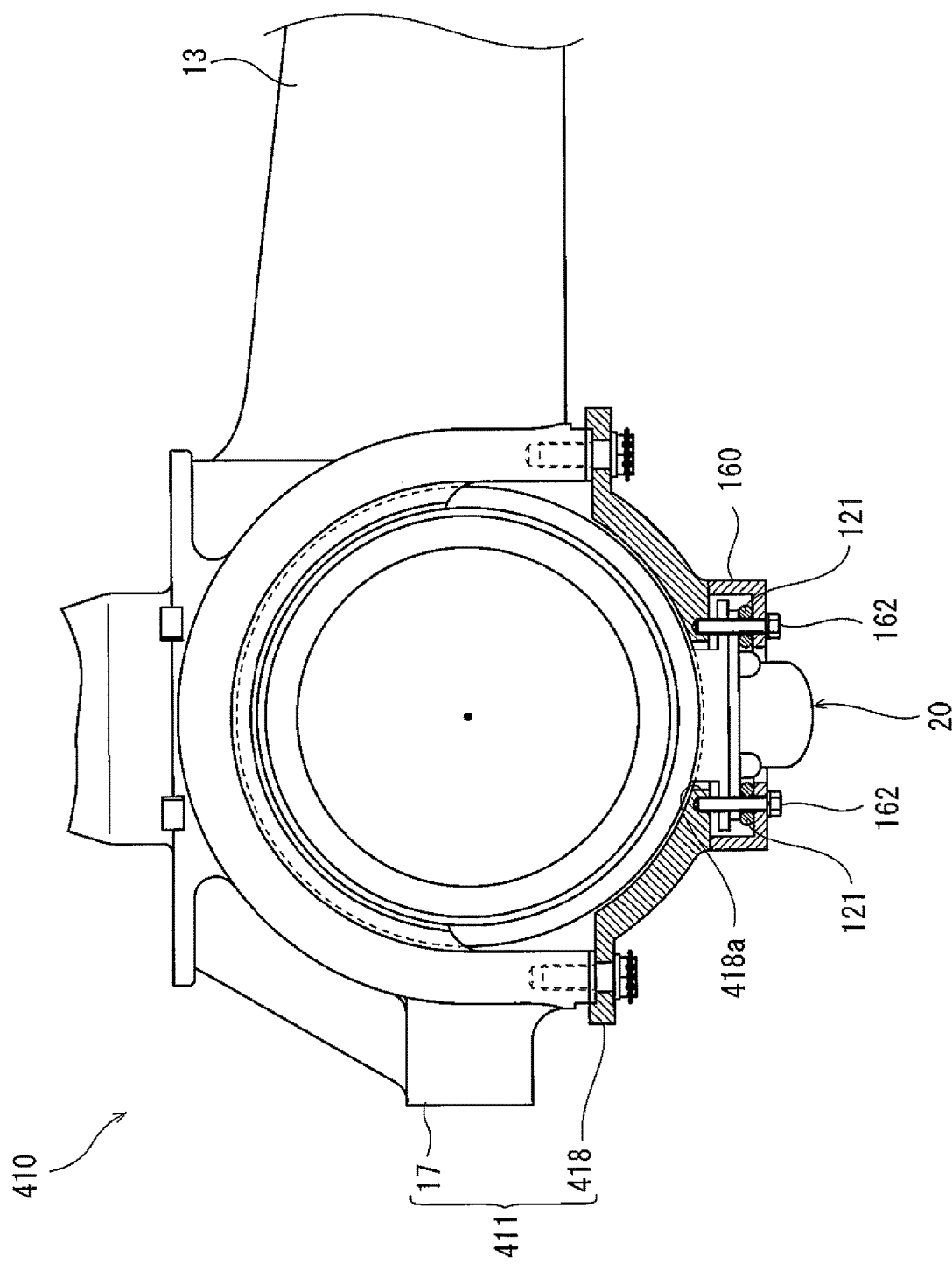
FIG. 7 is a partial sectional side view of major components of the bogie according to Embodiment 5.

FIG. 7 is a partial sectional side view of major components of the bogie according to Embodiment 5. As shown in FIG. 7, in an axle box device 410 of Embodiment 5, an axle box 411 includes the upper axle box element 17 and a lower axle box element 418. The upper axle box element 17 covers the upper region of the outer peripheral surface of the outer ring 8*a* of the bearing 8. The lower axle box element 418 covers the lower region of the outer peripheral surface of the outer ring 8*a* of the bearing 8 and is attachable to and detachable from the upper axle box element 17. The lower axle box element 418 includes an opening 418*a* through which the temperature sensor unit 20 is inserted. To be specific, the temperature sensor unit 20, the elastic bodies 121, and the fixing bracket 160 are attached to the lower axle box element 418 from an outside of the lower axle box element 418 by the fastening members 162. The other components are the same as those of Embodiment 2.

Embodiment 6

Figure 8:
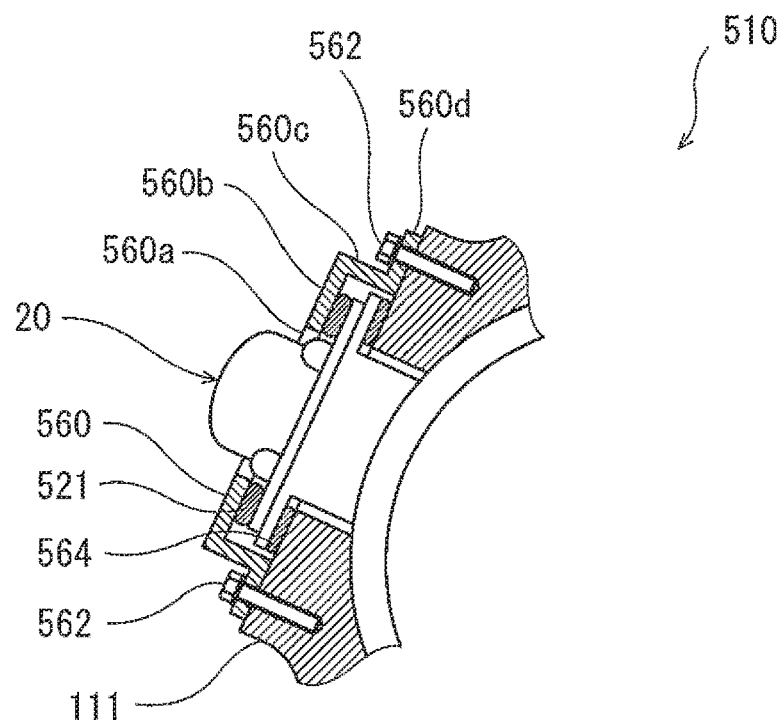
FIG. 8 is a partial sectional side view of major components of the bogie according to Embodiment 6.

FIG. 8 is a partial sectional side view of major components of the bogie according to Embodiment 6. As shown in FIG. 8, in an axle box device 510 of Embodiment 6, a fixing bracket 560 includes a substrate portion 560*b*, a side plate portion 560*c*, and a flange portion 560*d*. The substrate portion 560*b* includes a through hole 560*a* through which the temperature sensor unit 20 is inserted. The side plate portion 560*c* projects from both ends of the substrate portion 560*b* toward the axle box 111 and covers the temperature sensor unit 20. The flange portion 560*d* projects outward from the side plate portion 560*c* along an outer surface of the axle box 111. In a state where the substrate portion 560*b* and the side plate portion 560*c* cover the temperature sensor unit 20 and an elastic body 521 from an outside, the flange portion 560*d* is fixed to the axle box 111 by fastening members 562. Since a fastening member is not inserted through any of the elastic body 521 interposed between the substrate portion 560*b* and the temperature sensor unit 20 and an elastic body 564 interposed between the axle box 111 and the temperature sensor unit 20, the elastic bodies 521 and 564 are smaller than the elastic bodies 121 and 264 of Embodiments 2 to 5. The other components are the same as those of Embodiment 3.

Embodiment 7

Figure 9:
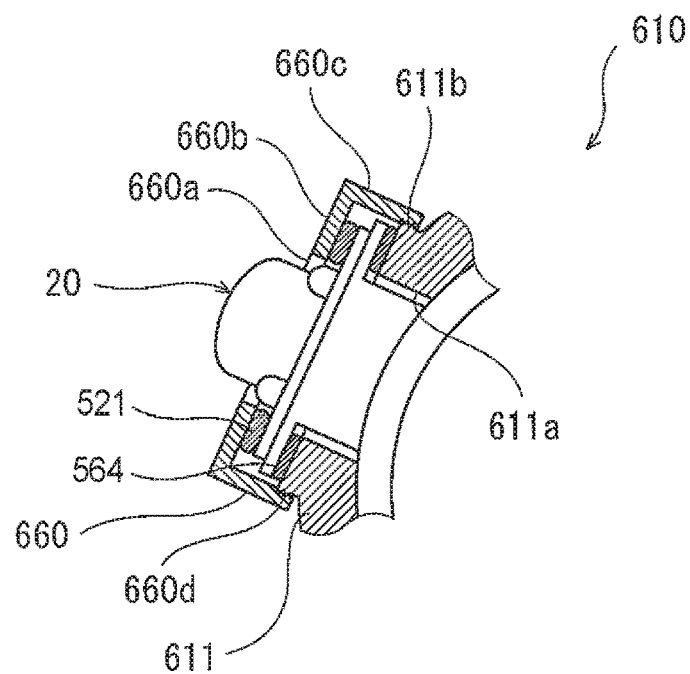
FIG. 9 is a partial sectional side view of major components of the bogie according to Embodiment 7.

FIG. 9 is a partial sectional side view of major components of the bogie according to Embodiment 7. As shown in FIG. 9, in an axle box device 610 of Embodiment 7, a fixing bracket 660 includes a substrate portion 660*b* and a cylindrical portion 660*c*. The substrate portion 660*b* includes a through hole 660*a* through which the temperature sensor unit 20 is inserted. The cylindrical portion 660*c* projects from both ends of the substrate portion 660*b* toward an axle box 611 and covers the temperature sensor unit 20. An internal screw portion 660*d* is formed on an inner peripheral surface of the cylindrical portion 660*c*. The axle box 611 includes an opening 611*a* through which the temperature sensor unit 20 is inserted, and an external screw portion 611*b* is formed around the opening 611*a*. To be specific, the fixing bracket 660 can be attached to the axle box 611 in such a manner that the internal screw portion 660*d* is threadedly engaged with the external screw portion 611*b* without using any fastening member.

Embodiment 8

Figure 10:
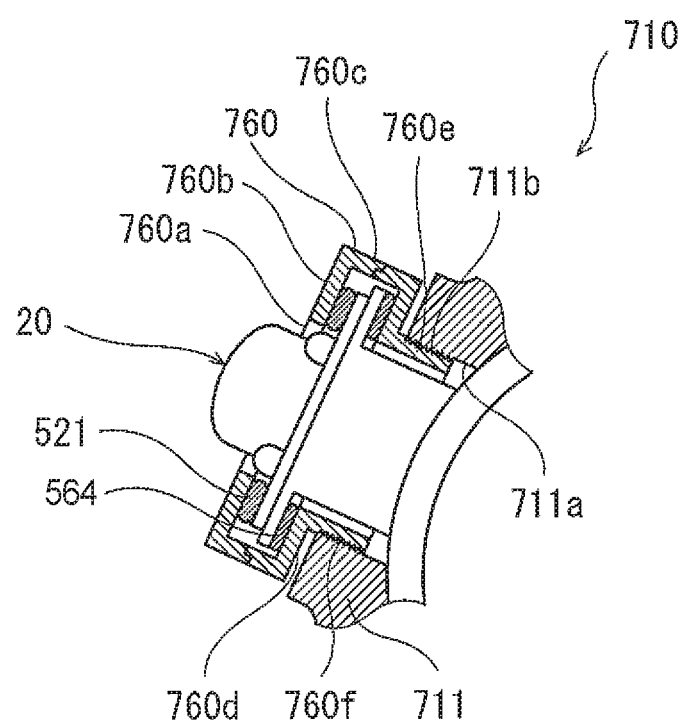
FIG. 10 is a partial sectional side view of major components of the bogie according to Embodiment 8.

FIG. 10 is a partial sectional side view of major components of the bogie according to Embodiment 8. As shown in FIG. 10, in an axle box device 710 of Embodiment 8, a fixing bracket 760 includes a substrate portion 760*b*, a side plate portion 760*c*, an inner plate portion 760*d*, and a cylindrical portion 760*e*. The substrate portion 760*b* includes a through hole 760*a* through which the temperature sensor unit 20 is inserted. The side plate portion 760*c* projects from both ends of the substrate portion 760*b* toward an axle box 711 and covers the temperature sensor unit 20. The inner plate portion 760*d* projects from the side plate portion 760*c* along an outer surface of the axle box 711 toward a radially inner side. The cylindrical portion 760*e* projects from the inner plate portion 760*d* toward the axle box 711. An external screw portion 760*f* is formed on an outer peripheral surface of the cylindrical portion 760*e*. The axle box 711 includes an opening 711*a* through which the temperature sensor unit 20 is inserted, and an internal screw portion 711*b* is formed on an inner peripheral surface of the opening 711*a*. To be specific, the fixing bracket 760 can be attached to the axle box 711 in such a manner that the external screw portion 760f is threadedly engaged with the internal screw portion 711b without using any fastening member.

The present invention is not limited to the above embodiments, and modifications, additions, and eliminations may be made with respect to the configuration of the present invention. For example, the thermal conduction sheet 39 between the contact member 38 and the base plate 40 may be omitted, and the contact member 38 may be formed integrally with the base plate 40. To be specific, the base plate may be provided with a heat receiving surface that is in surface contact with the outer ring 8a. The battery 36 may not be attached to the wireless communication board 35 and may be attached to the sensor substrate 34. The heat insulating member 37 may be omitted. The coupling portion configured to couple the axle box main body 12 to the bogie frame 3 is not limited to an axle beam type and may be a different type. The bogie 1 may include plate springs instead of the side sills 4 and the coil springs 16. To be specific, spring receiving portions of a pair of front and rear axle boxes may support both respective longitudinal direction end portions of each of the plate springs from below, and longitudinal direction middle portions of the plate springs may support a cross beam from below.

REFERENCE SIGNS LIST 1 bogie
3 bogie frame
6 axle
8 bearing
8a outer ring
11, 111, 411, 611, 711 axle box
111a, 418a, 611a, 711a opening
13 axle beam portion (coupling portion)
14 spring receiving portion
17 upper axle box element (first axle box element)
18, 418 lower axle box element (second axle box element)
20 temperature sensor unit
21a, 121, 264, 521, 564 elastic body
38c heat receiving surface
46 stopper portion
160, 360, 560, 660 fixing bracket
X rotation axis

The invention claimed is:

1. A temperature sensor unit-equipped axle box device of a railcar bogie,
the temperature sensor unit-equipped axle box device comprising:
an axle box accommodating a bearing configured to support an axle;
a temperature sensor unit attached to the axle box and configured to detect a temperature of an outer ring of the bearing; and
an elastic body configured to bias the temperature sensor unit in such a direction that the temperature sensor unit is pressed against the outer ring;
wherein the temperature sensor unit is displaceable relative to the axle box around a rotation axis of the bearing, and the elastic body is elastically deformable so as to follow displacement of the temperature sensor unit around the rotation axis of the bearing.

2. The temperature sensor unit-equipped axle box device according to claim 1, wherein the temperature sensor unit includes a circular-arc heat receiving surface that is in surface contact with an outer peripheral surface of the outer ring.

3. The temperature sensor unit-equipped axle box device according to claim 1, wherein the axle box includes a stopper portion configured to restrict displacement of the temperature sensor unit around the rotation axis to a predetermined range.

4. The temperature sensor unit-equipped axle box device according to claim 1, wherein the temperature sensor unit includes therein a wireless transmission portion configured to transmit information regarding the detected temperature of the outer ring as a wireless signal.

5. The temperature sensor unit-equipped axle box device according to claim 1, further comprising a fixing bracket detachably fixed to the axle box from an outside, wherein:
the axle box includes an opening;
the temperature sensor unit is attached to the fixing bracket through the elastic body; and
in a state where a gap is formed between the temperature sensor unit and the axle box in a direction in which the elastic body generates elastic force, the temperature sensor unit extends from the outside of the axle box through the opening and contacts the outer ring of the bearing.

6. A temperature sensor unit-equipped axle box device of a railcar bogie,
the temperature sensor unit-equipped axle box device comprising:
an axle box accommodating a bearing configured to support an axle;
a temperature sensor unit attached to the axle box and configured to detect a temperature of an outer ring of the bearing; and
an elastic body configured to bias the temperature sensor unit in such a direction that the temperature sensor unit is pressed against the outer ring;
wherein:
the elastic body is elastically deformable so as to follow displacement of the temperature sensor unit around the rotation axis of the bearing;
the axle box includes
a first axle box element covering a first region of an outer peripheral surface of the outer ring and
a second axle box element covering a second region of the outer peripheral surface of the outer ring;
the first axle box element includes
a coupling portion coupled to a bogie frame and
a spring receiving portion supporting a spring interposed between the spring receiving portion and the bogie frame;
the second axle box element is detachably attached to the first axle box element; and
the temperature sensor unit is attached to the second axle box element.

7. The temperature sensor unit-equipped axle box device according to claim 6, wherein the temperature sensor unit includes a circular-arc heat receiving surface that is in surface contact with an outer peripheral surface of the outer ring.

8. The temperature sensor unit-equipped axle box device according to claim 6, wherein the axle box includes a stopper portion configured to restrict displacement of the temperature sensor unit around the rotation axis to a predetermined range.

9. The temperature sensor unit-equipped axle box device according to claim 6, wherein the temperature sensor unit includes therein a wireless transmission portion configured to transmit information regarding the detected temperature of the outer ring as a wireless signal.

10. The temperature sensor unit-equipped axle box device according to claim 6, further comprising a fixing bracket detachably fixed to the axle box from an outside, wherein:
the axle box includes an opening;
the temperature sensor unit is attached to the fixing bracket through the elastic body; and
in a state where a gap is formed between the temperature sensor unit and the axle box in a direction in which the elastic body generates elastic force, the temperature sensor unit extends from the outside of the axle box through the opening and contacts the outer ring of the bearing.

11. A temperature sensor unit-equipped axle box device of a railcar bogie,
the temperature sensor unit-equipped axle box device comprising:
an axle box accommodating a bearing configured to support an axle;
a temperature sensor unit attached to the axle box and configured to detect a temperature of an outer ring of the bearing; and
an elastic body configured to bias the temperature sensor unit in such a direction that the temperature sensor unit is pressed against the outer ring;
wherein:
the elastic body is elastically deformable so as to follow displacement of the temperature sensor unit around the rotation axis of the bearing;
the axle box is divided into an upper axle box element supporting a load applied from a bogie frame and a lower axle box element located at a lower side of the upper axle box element and attachable to and detachable from the upper axle box element; and
the temperature sensor unit is attached to the lower axle box element.

12. The temperature sensor unit-equipped axle box device according to claim 11, wherein the temperature sensor unit includes a circular-arc heat receiving surface that is in surface contact with an outer peripheral surface of the outer ring.

13. The temperature sensor unit-equipped axle box device according to claim 11, wherein the axle box includes a stopper portion configured to restrict displacement of the temperature sensor unit around the rotation axis to a predetermined range.

14. The temperature sensor unit-equipped axle box device according to claim 11, wherein the temperature sensor unit includes therein a wireless transmission portion configured to transmit information regarding the detected temperature of the outer ring as a wireless signal.

15. The temperature sensor unit-equipped axle box device according to claim 11, further comprising a fixing bracket detachably fixed to the axle box from an outside, wherein:
the axle box includes an opening;
the temperature sensor unit is attached to the fixing bracket through the elastic body; and
in a state where a gap is formed between the temperature sensor unit and the axle box in a direction in which the elastic body generates elastic force, the temperature sensor unit extends from the outside of the axle box through the opening and contacts the outer ring of the bearing.

16. A temperature detecting device of a railcar bogie,
the temperature detecting device comprising:
a temperature sensor unit configured to detect a temperature of an outer ring of a bearing through an opening of an axle box accommodating the bearing, the bearing supporting configured to support an axle; and
an elastic body configured to bias the temperature sensor unit in such a direction that the temperature sensor unit is pressed against the ring;
wherein the temperature sensor unit is displaceable relative to the axle box around a rotation axis of the bearing, and the elastic body is elastically deformable so as to follow displacement of the temperature sensor unit around the rotation axis of the bearing.

17. The temperature detecting device according to claim 16, the temperature detecting device further comprising a fixing bracket detachably fixed to the axle box from an outside, wherein:
the temperature sensor unit is attached to the fixing bracket through the elastic body; and
in a state where a gap is formed between the temperature sensor unit and the axle box in a direction in which the elastic body generates elastic force, the temperature sensor unit extends from the outside of the axle box through the opening and contacts the outer ring of the bearing.

* * * * *